United States Patent [19]

Ishikawa

[11] Patent Number: 6,082,201
[45] Date of Patent: Jul. 4, 2000

[54] METHOD AND APPARATUS FOR MEASURING DISPLACEMENT OF TERMINAL CONTACT SEGMENT

[75] Inventor: Tatsuya Ishikawa, Shizuoka, Japan

[73] Assignee: Yazaki Corporation, Tokyo, Japan

[21] Appl. No.: 09/170,194

[22] Filed: Oct. 13, 1998

[30] Foreign Application Priority Data

Oct. 14, 1997 [JP] Japan .................................. 9-280290

[51] Int. Cl.⁷ .................................................. G01N 3/20
[52] U.S. Cl. .............................. 73/849; 324/500; 439/109
[58] Field of Search ............................. 73/812, 849, 852, 73/853, 854; 324/500, 512; 439/109, 110

[56] References Cited

U.S. PATENT DOCUMENTS

| | | | |
|---|---|---|---|
| 4,056,773 | 11/1977 | Sullivan | 324/500 |
| 4,118,091 | 10/1978 | Frisby | 439/101 |
| 4,924,709 | 5/1990 | Plyter | 73/829 |
| 5,370,543 | 12/1994 | Hamada et al. | 439/188 |
| 5,775,936 | 7/1998 | Tsuji | 439/489 |
| 5,841,291 | 11/1998 | Liu et al. | 324/755 |

FOREIGN PATENT DOCUMENTS

| | | |
|---|---|---|
| 24 49 813 A1 | 4/1976 | Germany . |
| 25 29 491 A1 | 1/1977 | Germany . |
| 35 07 514 A1 | 9/1986 | Germany . |

OTHER PUBLICATIONS

Ch. Rohrbach, Handbuch für experimentelle Spannungsanalyse, VDI–Verlag, Düsseldorf, 1989, pp. 486–489.

*Primary Examiner*—Max Noori
*Attorney, Agent, or Firm*—Armstrong, Westerman, Hattori, McLeland & Naughton

[57] ABSTRACT

An apparatus for measuring a permanent displacement of an elastic contact segment of a terminal having a displacing load imposing unit, wherein a terminal to be measured is clamped on a surface of a terminal mounting plate, a load imposing head is operated to impose load onto the elastic contact segment of the terminal with its load imposer, a displacement of the load imposing head is measured by a measuring instrument and the contact between the load imposer an the elastic contact segment of the terminal is detected by a circuit tester. An initial contact position of the load imposer with the elastic contact segment is measured at first and continuing to load the elastic contact segment until it reaches a predetermined deformed position. This deformed elastic contact segment is inprocess heat treated and then unloaded by reversing the movement of the load imposer after completing the heat treatment. A leaving position of the load imposer from the elastic contact segment is measured, and then a permanent deformation of the elastic contact segment is measured by a difference between the displacement from the predetermined deformed position to the leaving position and the displacement from the initial contact position to the predetermined deformed position.

8 Claims, 4 Drawing Sheets

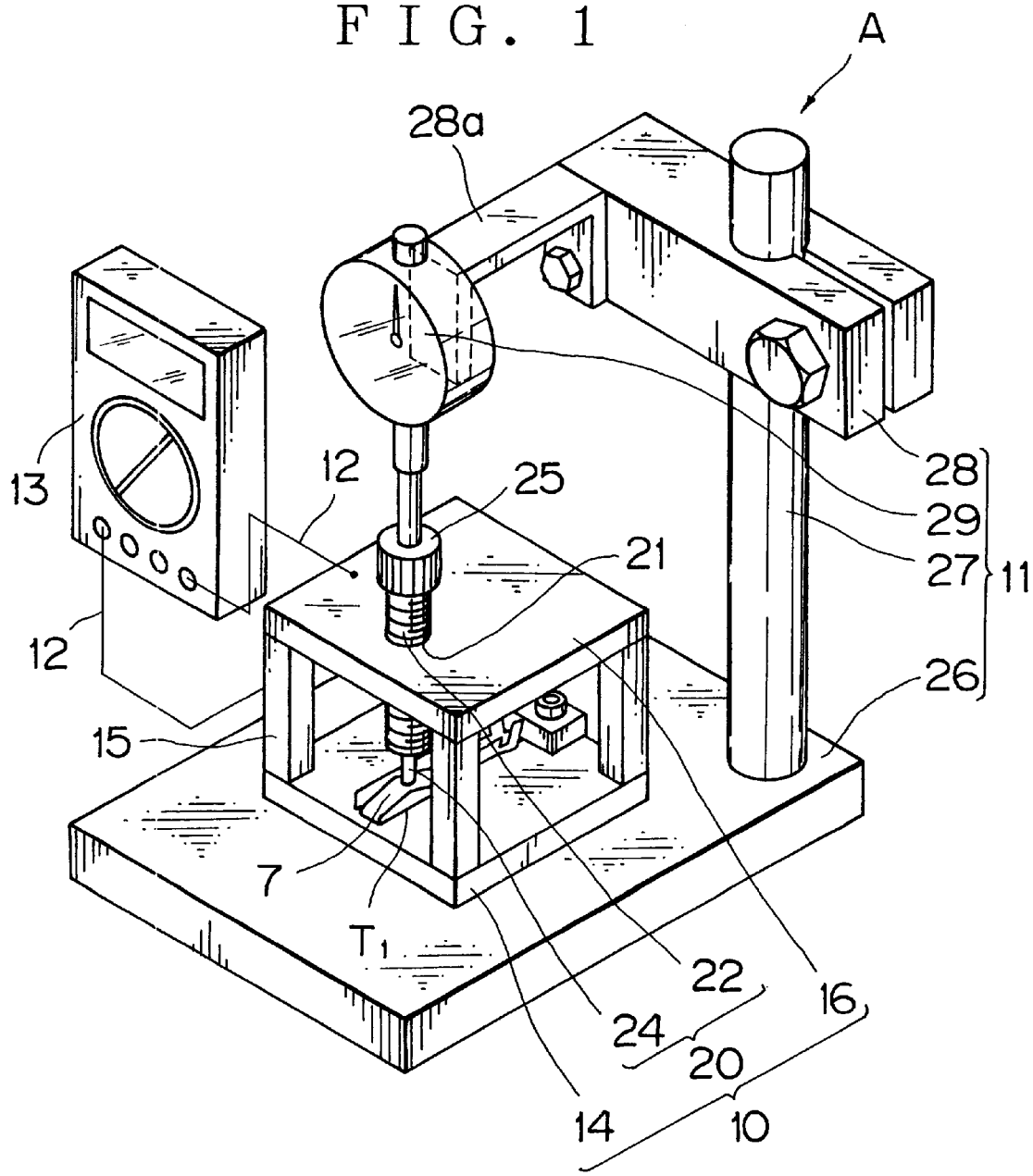
F I G. 1

METHOD AND APPARATUS FOR MEASURING DISPLACEMENT OF TERMINAL CONTACT SEGMENT

FIELD OF THE INVENTION

This invention relates to a method and apparatus for evaluating a decrease of elastic strength of an elastic contact segment of a terminal by measuring a permanent deformation of the elastic contact segment, more specifically, for evaluating the decrease of elastic strength of the contact segment of a female terminal which contacts a male terminal with pressure when the male and female terminals are engaged with each other.

BACKGROUND OF THE INVENTION

A decrease of elastic strength of a contact segment of a female terminal has been measured by employing a thickness gauge after disengaging engaged male and female terminals accommodated in respective connectors or separately engaged male and female terminals.

One of such female terminal $T_1$ is shown in FIG. 5 as a perspective view, wherein an electrically connecting portion 2 which engages with a mating male terminal is provided at one end of a base plate 1 and, at the other end of the base plate 1, there are provided conductor clamping segments 4 and insulator clamping segments 5 for a lead wire.

The electrically connecting portion 2 consists of side walls 6a, 6a raised from both sides of the base plate 1 and an upper wall 6b formed by bending inwardly the side walls to abut each other with their tip ends so as to form a square sleeve 6, and one extended end portion of the base plate 1 is folded back to form an elastic contact segment 7, the tip end of which is contacted with or placed in a proximity of the inner surface of the upper wall 6b.

By inserting a nose of a male terminal into the square sleeve 6 of the female terminal, the nose of the male terminal is pushed upward against the inner surface of the upper wall 6b by elasticity of the elastic contact segment 7 and the male terminal and female terminal $T_1$ are electrically connected with each other by the elastic contact. However, the strength of the elastic contact segment 7 to push the male terminal is decreased in proportion to a time lapse if the elastic contact segment is pressed against the male terminal for a long period of time.

In order to measure the decrease of the elastic strength of the elastic contact segment, there have been two ways such that female terminals and male terminals are connected electrically in the same manner as in the actual use by engaging a female connector housing accommodating female terminals with a male connector housing accommodating male terminals or by engaging a single female terminal directly with a single male terminal to provide electrical connection.

A method of measuring the decrease of elastic strength of the contact segment is illustrated in FIG. 6A through FIG. 6C. As shown in FIG. 6A, by directing the nose of the male terminal $T_2$ toward the front end of the female terminal $T_1$, and inserting the nose of the male terminal $T_2$ into the square sleeve 6 of the female terminal $T_1$, the nose of the male terminal $T_2$ is pushed upward against the upper wall 6b of the female terminal with the elasticity of the elastic contact segment of the female terminal $T_1$, thus both terminals $T_1$ and $T_2$ are engaged with each other (see FIG. 6B).

Both terminals $T_1$ and $T_2$ are then heat treated by keeping the state of engagement and, in the next, the terminals $T_1$ and $T_2$ are disengaged. A gap formed between the elastic contact segment 7 and the upper wall 6b of the female terminal $T_1$ is measured by inserting a thickness gauge (see FIG. 6C) for determining an amount of permanent deformation of the elastic contact segment 7 or the decrease of the elastic strength of the elastic contact segment 7 of the female terminal $T_1$.

In such a conventional measuring method, it has been necessary to prepare a large number of male terminals $T_2$ which engage with the female terminal $T_1$ and, furthermore, it has been necessary to prepare the male terminals $T_2$ having different thickness noses to evaluate an effect of permanent distortion of the elastic contact segment 7 to be caused by different thickness of the noses of the male terminals $T_2$. Further, the thickness of the nose of the male terminal $T_2$ must be tightly restricted in dimensional tolerances, this has resulted in a great difficulty in preparing the measurement of the permanent deformation of the electric contact segment.

In measuring operation, the conventional method of measuring a gap between the elastic contact segment and the upper wall of the square sleeve of the female terminal by employing a thickness gauge 8 lacks precision in measurement and has been inefficient.

It is therefore an object of the present invention to eliminate the problems encountered in the conventional method of measuring a permanent deformation of an elastic contact segment of a female terminal and to provide a method and apparatus for measuring a permanent deformation of the elastic contact segment of the female terminal with greater precision and high efficient by applying an optional amount of displacement onto the elastic contact segment of the female terminal.

SUMMARY OF THE INVENTION

In order to attain the above objective and in accordance with the present invention, there is provided an apparatus for measuring an elastic deformation of an elastic contact segment of a terminal comprises a displacing load imposing unit for imposing load on an elastic contact segment of a terminal to be measured clamped on a surface of a terminal mounting plate consisting of a non-conductive material, a terminal clamper provided on the surface of the terminal mounting plate for clamping the terminal, a conductive metal plate disposed at diametrically opposite point on the terminal mounting plate by incorporating spacers therebetween and a load imposing head displaceable in a direction of imposing load onto the elastic contact segment of the terminal; a measuring unit for measuring a displacement of the load imposing head having a measuring instrument; and a circuit tester connected between wires which are connected to the elastic contact segment of the terminal and the load imposing head.

The load imposing head consists of a threaded rod to be screwed into a screw hole drilled and tapped on the metal plate, a measuring instrument contact surface provided at right angle to a vertical axis of the threaded rod and a load imposer which loads or unloads the elastic contact segment of the terminal.

Further, in accordance with the present invention, there is provided, by employing the apparatus as described above, a method of measuring an elastic deformation of an elastic contact segment of a terminal comprising the steps of displacing a displacing load imposing head which has a load imposer toward an elastic contact segment of a terminal, measuring an initial contact position at where the load imposer contacts the elastic contact segment of the terminal, continuing to impose additional load onto the elastic contact segment of the terminal in the same direction to deform it until it reaches a predetermined deformed position, heat treating the deformed elastic contact segment by maintaining the state of deformation caused by the load imposer, displacing the load imposer by reversing its loading direction after completing the heat treatment, measuring a leaving position of the load imposer from the elastic contact segment of the terminal, and measuring a permanent amount of elastic deformation of the elastic contact segment basing on a difference between the amount of measured displacement from the predetermined deformation to the leaving position of the load imposer and the amount of measured displacement from the initial contact position to the predetermined deformed position.

The contact or non-contact of the load imposer with the elastic contact segment of the terminal can be detected by means of a circuit tester connected between wires which are electrically connected to the load imposing head and the elastic contact segment.

BRIEF DESCRIPTION OF THE DRAWINGS

FIG. 1 is a perspective view of an apparatus for measuring a displacement of an elastic segment of a terminal embodying the present invention;

DESCRIPTION OF THE PREFERRED EMBODIMENT

As shown in FIG. 1, an apparatus A for measuring a displacement of an elastic segment of a terminal consists of a displacing load imposing unit 10, a displacement measuring unit 11 and a circuit tester 13 connected in between electric wires communicated with the displacing load imposing unit 10.

Figure 2:
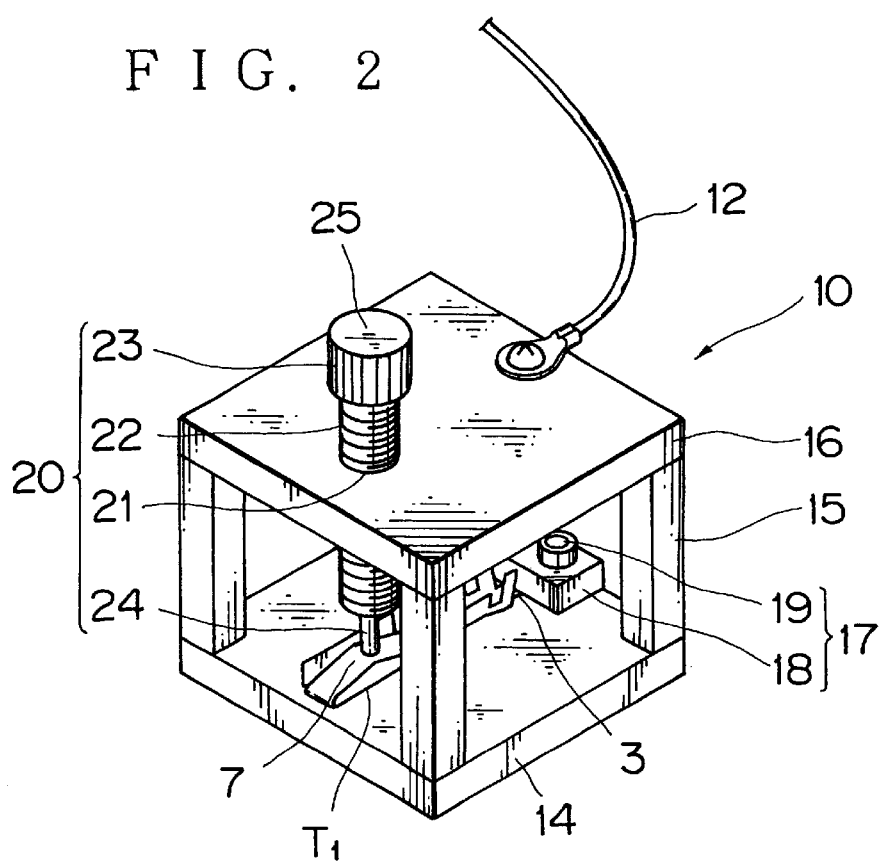
FIG. 2 is a perspective view of a displacing load imposing unit installed in the apparatus for measuring the displacement of the elastic segment of the terminal.

In the displacing load imposing unit 10, there are provided a terminal mounting plate 14 made of a nonconductive material, such as a heat resistive plastic material formed into a plate-like shape, and a electroconductive plate 16 made of a conductive material disposed at diametrically opposite point on the terminal mounting plate 14 by incorporating spacers 15 therebetween (see FIG. 2).

Figure 3:
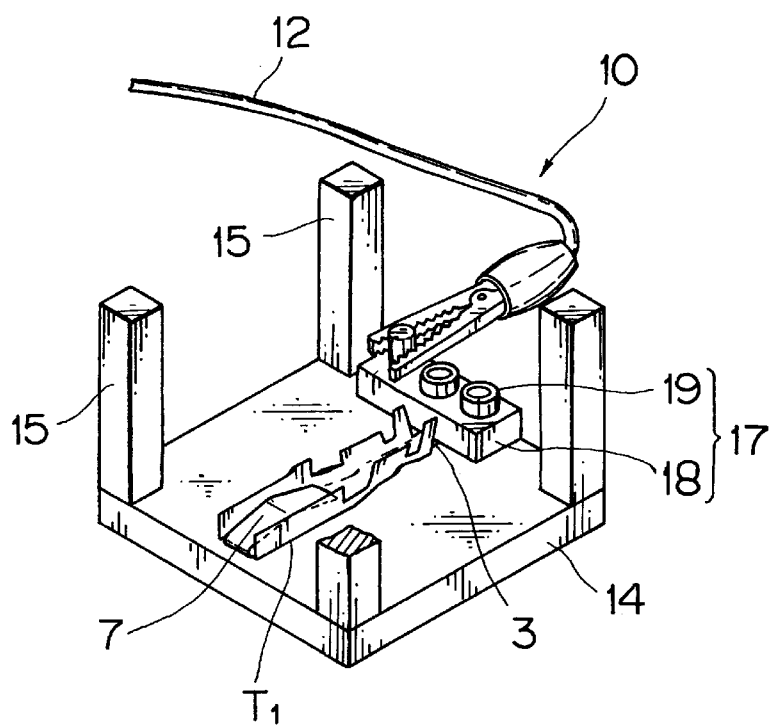
FIG. 3 is a perspective view of a main portion of the displacing load imposing unit.

A terminal damper 17 mounted on a surface of the terminal mounting plate 14 is provided for positioning and clamping a female terminal $T_1$ on the surface of the terminal mounting plate 14 and has a metallic clamp plate 18 for clamping a wire connecting portion 3 of the female terminal $T_1$ and clamping screws 19 (see FIG. 3).

A load imposing head 20 mounted on the metal plate 16 consists of a threaded rod 22 having a head portion 23 at its top and a load imposer 24 at its bottom portion and is screwed into a screw hole 21 drilled and tapped on the metal plate 16 positioned right over the female terminal $T_1$ clamped on the terminal mounting plate by the terminal damper 17 at its wire connecting portion 3, whereby the top end of the head portion 23 is formed into a measuring instrument contact surface 25 provided at a right angle to a vertical axis of the threaded rod 22.

The female terminal $T_1$ to be measured is removed its upper wall 6b or provided a hole on the upper wall 6b so that the load imposer 24 can be lowered into contact with the elastic contact segment 7 of the female terminal $T_1$ by screwing the threaded rod 22 at its head portion 23.

Figure 4:
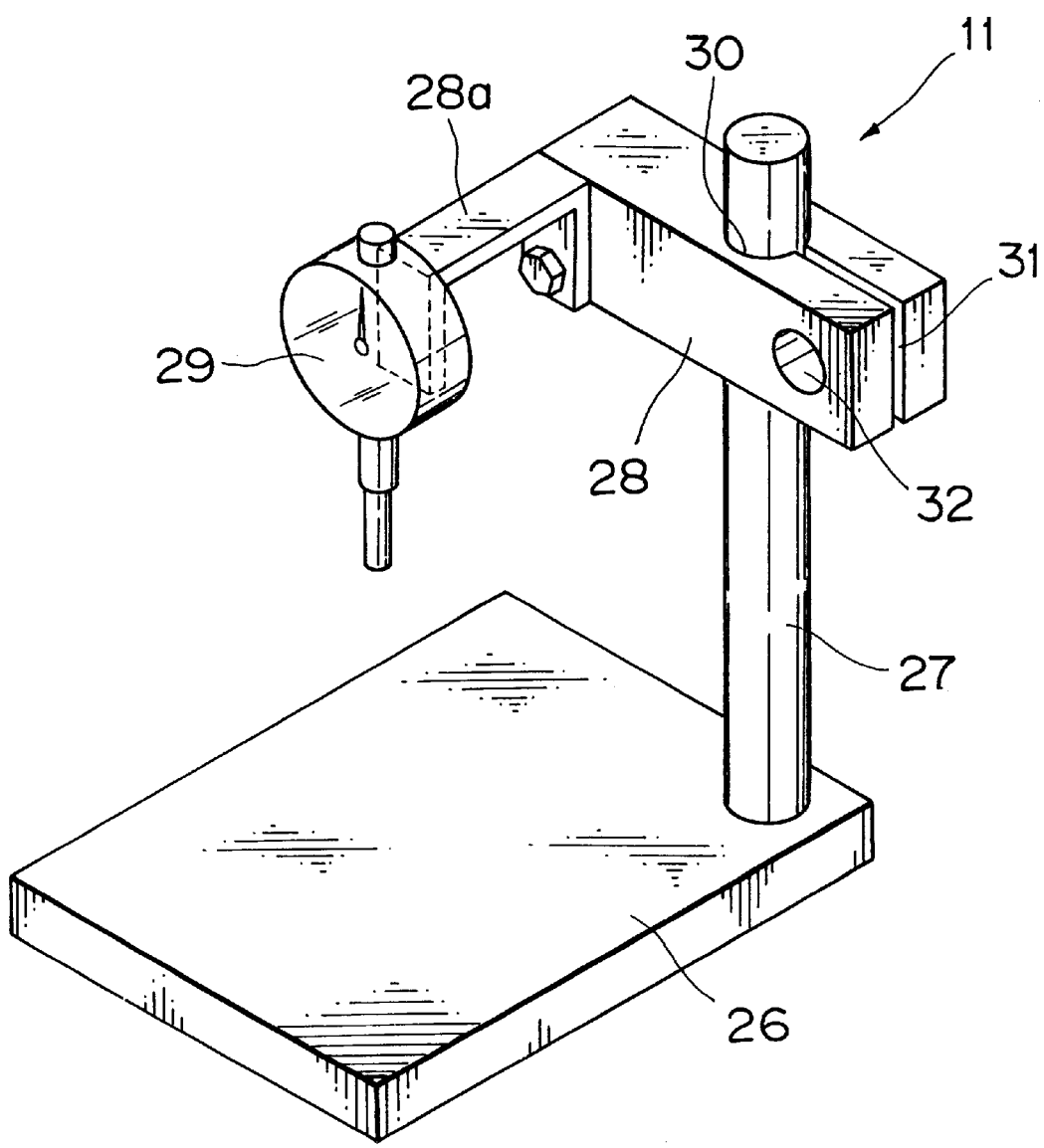
FIG. 4 is a perspective view of a displacement measuring unit installed in the apparatus for measuring the displacement of the elastic segment of the terminal.
Figure 5:
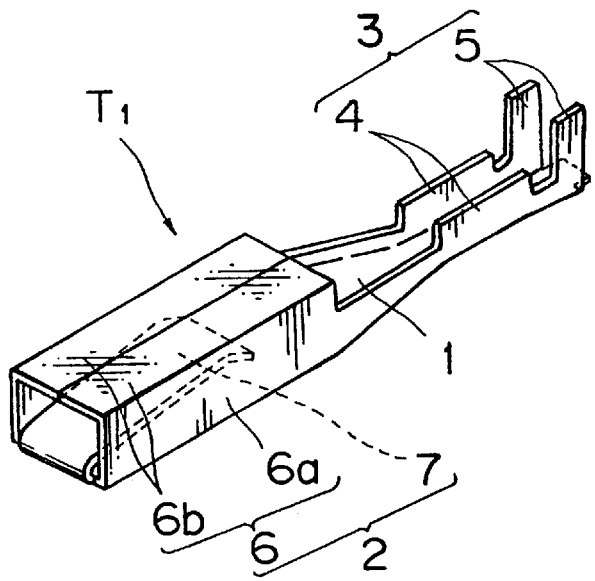
FIG. 5 is a perspective view of a female terminal.
Figure 6A:
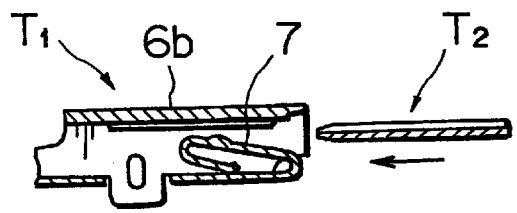
FIGS. 6A–6C are cross sectional views illustrating a conventional method of measuring a displacement of an elastic segment of a terminal.
Figure 6B:
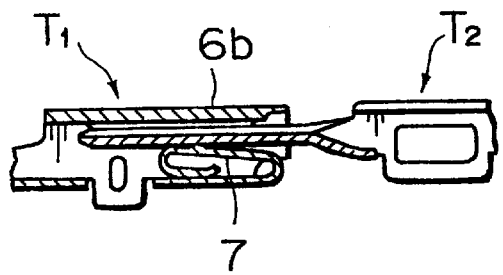
Figure 6C:
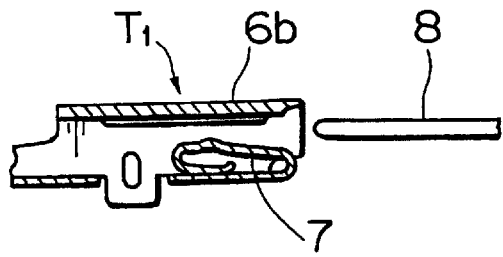

The displacement measuring unit 11 measures an amount of displacement of the load imposer 24 and consists of a bench 26 having an upper surface of precision flatness, a strut 27 standing up from the bench 26, a measuring instrument support arm 28 mounted on the strut 27 in a height adjustable manner and a measuring instrument 29 mounted on the support arm 28 (see FIG. 4).

The measuring instrument support arm 28 is provided with a slit 31 extending from a hole 30 through which the strut 27 is inserted to its tip end. Through holes are drilled on both legs of the support arm across the slit 31, one of which holes is a tapped hole and the other is a oversized through hole to receive a locking screw. The measuring instrument support arm can be secured to the strut 27 at any height by tightening the locking screw into the tapped hole.

A dial gauge is employed as the measuring instrument 29. By employing the dial gauge, it is possible to attain an accuracy of 1/100 mm, however, a dial gauge having an accuracy of 1/1000 mm is also available on the market.

The measuring instrument 29 is fixed by a screw to one end of a coupling arm 28a mounted on the front end of the measuring instrument support arm 28.

The circuit tester 13 is connected in between the electric wires 12 one of which is bonded on the metal plate 16 (see FIG. 1) and the other is connected to the metallic clamp plate 18 (see FIG. 3). When the load imposer 24 is lowered and touches the elastic contact segment 7 of the female terminal $T_1$, an electric circuit from the electric wire 12 to the metal plate 16 and the threaded rod 22 and an electric circuit from the female terminal $T_1$ to the metallic clamp plate 18 and the electric wire 12 are connected electrically and an electric current follows therethrough, thus the contact of the load imposer 24 on the elastic contact segment 7 of the female terminal $T_1$ can be detected by the circuit tester 13.

A method of measuring displacement of the elastic contact segment 7 of the female terminal $T_1$ by employing the displacement measuring apparatus A as defined above will now be described.

The female terminal $T_1$, removed its upper wall 6b of the square sleeve, is positioned on the terminal mounting plate 14 and clamped thereon with the terminal clamper 17 at the wire connecting portion 3 of the female terminal $T_1$ (see FIG. 3).

The displacing load imposing unit 10, on which the female terminal $T_1$ is clamped, is place on the bench 26 of the displacement measuring unit 11.

Because the surface of the bench 26 is so finished as to have the greater accuracy, there will be no change in height of the female terminal $T_1$ even if the positioning of the displacing load imposing unit 10 is varied on the bench 26.

Since one end of the electric wire 12 is connected to the metal plate 16 and that the other end to the terminal clamper 17, as the load imposer 24 is lowered by screwing the threaded rod 22 of the load imposing head 20 into the screw hole 21, the load imposer 24 touches the elastic segment 7 of the female terminal T₁ and the touching is detected by the circuit tester 13 in the form of electric conduction and displayed on the circuit tester 13.

The touching of the load imposer 24 to the elastic segment 7 of the female terminal thus detected is defined as the initial contact point of the load imposer 24 and the threaded rod 22 is stopped its lowering at the instant of conduction of the circuit tester 13.

By contacting the nose of the measuring instrument (dial gauge) 29 on the measuring instrument contact surface 25 of the head portion 23 of the threaded rod 22 and by adjusting the rotary angle of a dial so as to bring a pointer over the zero indication of the dial gauge, the initial contact position of the load imposer 24 is set to zero on the dial.

In the next, the threaded rod 22 is further lowered by screwing the threaded rod 22 to deform the elastic contact segment 7 of the female terminal by watching an amount of deformation of the elastic segment 7 with the measuring instrument (dial gauge) 29, and when the amount of deformation of the elastic contact segment 7 reaches to a predetermined amount, the lowering of the threaded rod 22 is stopped. The displacing load imposing unit 10 is then removed from the apparatus A together with the female terminal T₁ and is heat treated by maintaining the deformation of the elastic contact segment 7 of the female terminal T₁.

The heat treatment of the elastic contact segment 7 of the female terminal T₁ is implemented for realizing to give the same effect on the elastic contact segment 7 of the female terminal as in the actual use of the terminal, wherein the elastic contact segment is elastically deformed for a long period of time. For example, the heat treatment is implemented at the maximum temperature of 180° C. for 1000 hours.

Further, since the terminal mounting plate 14 is made of a heat resisting material such as fluorocarbon polymers, such as tetrafluoroethylene polymer (Teflon: Product name of Du Pont), there is no anxiety of deformation or contraction for the terminal mounting plate 14 during the heat treatment.

After completing the heat treatment, the displacing load imposing unit 10 is mounted again on the bench 26, the nose of the measuring instrument (dial gauge) 29 is contacted again on the measuring instrument contact surface 25 of the head portion 23 of the threaded rod 22, and the dial is set to zero once again. At this moment, the circuit tester 13 indicates the electric conduction.

From the state of the above, the threaded rod 22 is rotated in a counter direction to raise the load imposer 24 so as to unload the elastic contact segment 7 of the female terminal T₁, the rotation of the threaded rod 22 is stopped at the time when the circuit tester 13 indicates no electric conduction and then an indication of the measuring instrument (dial gauge) 29 is read for determining the leaving position of the load imposer 24 from the elastic contact segment 7 of the female terminal T₁.

An amount of displacement in unloading of the load imposer 24 from the displaced position of the predetermined amount of deformation to the leaving position is smaller than the amount of displacement in loading from the initial position to the displaced position of the predetermined amount of deformation. The permanent deformation caused to the elastic contact segment 7 of the female terminal T₁ is given by subtracting the second amount of displacement in unloading from the amount of displacement in loading.

As described above, according to the present invention, any mount of deformation can be imposed, as a predetermined deformation, on the elastic contact segment 7 of the female terminal T₁ and an amount of recovery of the elastic contact segment from the predetermined deformation after being heat treated can be read by the measuring instrument such as by the dial gauge, the measurement can be implemented with greater accuracy and simplicity, thus eliminates the need for special operator skills.

The features of the present invention can be summarized as follows:

1) In the conventional measuring system, it has been necessary to prepare a number of male terminals having different thickness noses, however, according to the present invention, there is no need of preparing any kind of male terminals in the measurement of permanent deformation of an elastic contact segment of a female terminal and the preparation of such measurement is greatly simplified.

2) In the conventional measuring system, even though a number of male terminals having different thickness noses are prepared, an amount of deformation which can be applied on the elastic contact segment of the female terminal is determined by the thickness of each nose of the male terminals and it is not possible to set the amount of deformation optionally, however, according to the present invention, the amount of deformation to be applied on the female terminal can be set optionally to any amount of displacement.

3) In the conventional measuring system, since a gap at the male terminal receiving portion of the female terminal is measured with use of thickness gauges, the accuracy of the measurement has resulted in reduced accuracy and inefficient operation, however, according to the present Invention, because an amount of displacement of the elastic contact segment of the female terminal can be read directly by a measuring instrument, the measurement is of greater accuracy and efficient.

4) According to the present invention, it is possible to heat treat the displacing load imposing unit itself carrying the female terminal under measuring, the inprocess heat treatment in course of the measurement is greatly simplified and made easier.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for measuring an amount of displacement of an elastic contact segment of a terminal comprising:
   a displacing load imposing unit for imposing load on the elastic contact segment of the terminal to be measured including:
      a terminal mounting plate consisting of a nonconductive material,
      a terminal clamper provided on a surface of the terminal mounting plate for clamping the terminal,
      a conductive metal plate disposed at diametrically opposite point on the terminal mounting plate by incorporating spacers therebetween, and
      a load imposing head displaceable in a direction of imposing load onto the elastic contact segment of the terminal; and a measuring unit for measuring a displacement of the load imposing head having a measuring instrument and a circuit tester connected between wires which are connected to the elastic contact segment of the terminal and the load imposing head.

2. The apparatus for measuring an mount of displacement of an elastic contact segment of a terminal as defined in claim 1, wherein said load imposing head consists of a threaded rod to be screwed into a screw hole drilled and tapped on the metal plate, a measuring instrument contact surface provided at a right angle to a vertical axis of the threaded rod and a load imposer which loads or unloads the elastic contact segment of the terminal.

3. The apparatus for measuring an mount of displacement of an elastic contact segment of a terminal as defined in claim 1, wherein said terminal mounting plate consists of a nonconductive heat resisting material.

4. The apparatus for measuring an mount of displacement of an elastic contact segment of a terminal as defined in claim 1 or 2, wherein said measuring instrument is a dial gauge.

5. A method of measuring an amount of displacement of an elastic contact segment of a terminal comprising the steps of:

displacing a displacing load imposing head having a load imposer toward the elastic contact segment of the terminal;

measuring an initial contact position at where the load imposer contacts with the elastic contact segment of the terminal;

continuing to impose additional load onto the elastic contact segment of the terminal in the same direction to deform it until it reaches a predetermined deformed position;

heat treating the deformed elastic contact segment by maintaining the state of deformation given by the load imposer;

displacing the load imposer, by reversing its loading direction after completing the heat treatment;

measuring a leaving position of the load imposer from the elastic contact segment of the terminal; and measuring a amount of permanent displacement of the elastic contact segment of the terminal basing on a difference between the amount of measured displacement from the predetermined deformation to the leaving position of the load imposer and the amount of measured displacement from the initial contact position to the predetermined deformed position.

6. The method of measuring an amount of displacement of an elastic contact segment of a terminal as defined in claim 5, wherein detecting the contact or non-contact of the load imposer with the elastic contact segment by means of a circuit tester connected between wires which are electrically connected to the load imposing head and the elastic contact segment of the terminal.

7. The method of measuring an amount of displacement of an elastic contact segment of a terminal as defined in claim 5, wherein measuring the amount of displacement from said initial contact position to said predetermined deformed position and the amount of displacement from said predetermined deformed position to said leaving position are implemented by utilizing a dial gauge.

8. The method of measuring an amount of displacement of an elastic contact segment of a terminal as defined in claim 7, wherein the amount of displacement from said initial contact position to said predetermined deformed position is measured by setting said dial gauge to zero at said initial contact position and the amount of displacement from said predetermined deformed position to said leaving position is measured by setting said dial gauge to zero at said predetermined deformed position.

* * * * *